July 19, 1932. C. A. BROCK 1,867,647

SPRING

Filed July 19, 1928 2 Sheets-Sheet 1

INVENTOR
CLARENCE A. BROCK
BY
*Johnny Harness*
ATTORNEY

July 19, 1932.  C. A. BROCK  1,867,647
SPRING
Filed July 19, 1928  2 Sheets-Sheet 2

INVENTOR
CLARENCE A. BROCK
BY Irving Harness
ATTORNEY

Patented July 19, 1932

1,867,647

UNITED STATES PATENT OFFICE

CLARENCE A. BROCK, OF DETROIT, MICHIGAN

SPRING

Application filed July 19, 1928. Serial No. 293,858.

This invention relates to springs and particularly to leaf springs of the type employed in motor vehicles for supporting the chassis frame above the axles, and is an improvement over the construction shown and described in my Patent No. 1,380,523 issued June 7, 1921.

The principal object of the present invention is to provide a modified construction for connecting the ends of the various leafs of my spring to the vehicle frame, whereby to realize certain advantages resulting therefrom, such as economy in production and freedom of action of the spring.

The above being among the objects of the present invention, the same consists in certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views,—

Figure 1:
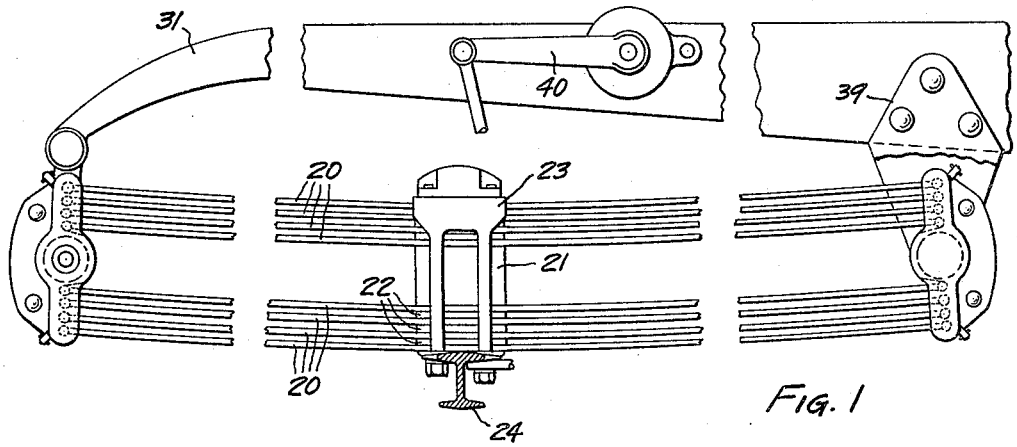
Fig. 1 is a more or less diagrammatic fragmentary side view of the front end of a motor vehicle chassis showing my improved spring construction in connection therewith.

Although the various constructions shown in the drawings in the present case may obviously be applied to the spring construction shown in my previous patent above referred to, I show in Fig. 1 a slightly different construction in which the spring leaves 20 are arranged in two series of four each, which series are separated from each other by a spacer 21. The leaves 20 of each series are separated by spacers 22 in the same manner as the construction indicated in my previous patent above referred to. A clamping member 23 of any suitable construction may be employed for securing the spring assembly to the axle 24.

Figures 2, 4:
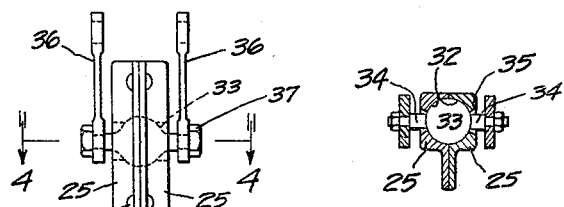
Fig. 2 is an end view of my improved spring viewed from the left-hand end of Fig. 1.
Fig. 4 is a sectional view taken on the line 4—4 of Fig. 2.
Figure 3:
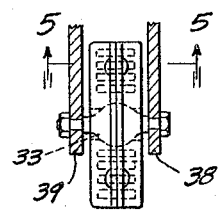
Fig. 3 is an end view of my improved spring taken from the right-hand end of Fig. 1.

The leaves 20 are spaced from each other over their entire length and their ends are received in housing members each of which comprises the two halves 25 secured together by rivets such as 26 or other suitable means. The leaves 20 taper from maximum width intermediate their ends to minimum width adjacent their ends, as illustrated in Fig. 4, and the end of each leaf 20, in the construction shown in Figs. 1 to 5 inclusive, is provided with an enlarged cylindrically-shaped end 27 projected laterally to each side of the end of the spring. The housing for the ends of the spring is formed in the two abutting halves 25, as shown, for the purpose of ease of manufacture and assembly, and each half is provided with vertically spaced recesses 29 which open on the abutting face of each half 25. The recesses 29 of each half 25 cooperate with each other when the halves 25 are secured together to form pockets in which the ends 27 of the leaves 20 are pivotally received, the inner edges of each pocket being, of course, cut away as at 28 to permit passage of the corresponding leaf 20 outwardly therefrom. The ends 27 are preferably provided with spherical end portions 30 which are adapted to bear against the bottom of the corresponding recesses 29 so as to prevent lateral movement of the ends 27 relative to the housing.

Where the spring assembly is made up of an upper and lower series of spring leaves as shown in Fig. 1, I prefer to provide a novel means of connecting the housing to the chassis frame 31 in the following manner. The housing halves 25 between the end portions in which the recesses 29 are formed, are formed to provide opposed ball seats 32 as shown in Fig. 4. Received between each pair of housing members 25 and bearing against the seats 32 is a ball member 33 provided with pin portions 34 projecting out from each side thereof through suitable openings 35 in the housing portions 25. Although the spring may be shackled at the rear end as in conventional constructions, I prefer to shackle it at the front end as shown in order that the deflection of the spring will have a minimum amount of effect on the pivotal position of the wheels through their connection with the usual drag link not shown, as is well understood in the art. The ball 33 at the front end of the spring is consequently connected by the shackle links 36 to the front end of the frame 31, the links 36 being connected to the pins 34 by nuts such as 37. The ball 33 at the rear end of the springs is connected in a similar manner to the yoked end 38 of a bracket 39 which is rigidly secured to the frame 31 in vertical alignment therewith. The result of this construction is that the housing portions 25 have universal movement on the balls 33 so as to permit them to swing about a horizontal line when the spring is deflected, and also to have limited movement about a vertical line so as to relieve the springs of torsional stresses due to unequal movement of the opposite wheels. Inasmuch as this type of spring is free of any friction between the leaves which might interfere with the free spring movement, a rebound check such as is indicated generally at 40 is preferably employed between the frame 31 and axle 34.

Figures 6, 7, 8:
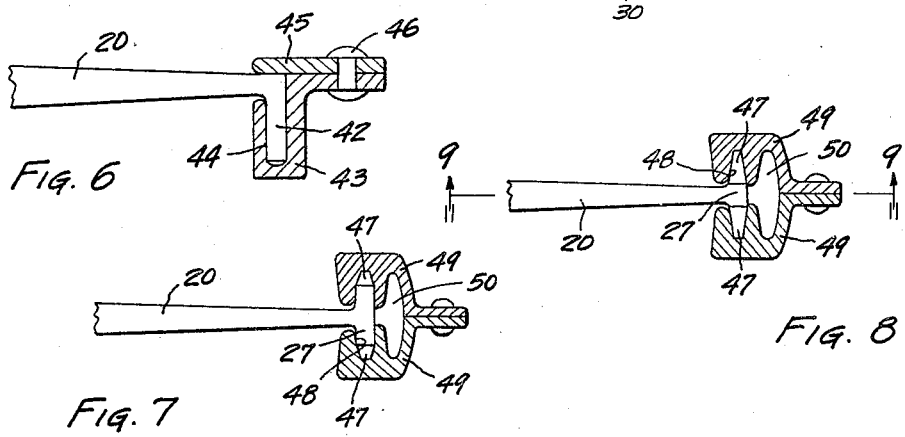
Fig. 6 is a view similar to Fig. 5, showing a modification thereof.
Fig. 7 is a view similar to Fig. 5 showing a modified construction for the end of the spring.
Fig. 8 is a view similar to Fig. 5 showing another modification of the construction of the end of a spring leaf.

It may be found desirable in some cases, especially when the construction is applied to a light vehicle, to form the leaves 20, as indicated in Fig. 6, in which they are provided with an end 42 projecting laterally therefrom in one direction only. The housing in this case is also simplified in that it requires but one portion 43 which is provided with a recess 44 for the reception of the end 42, the other portion of the housing comprising merely a flat plate 45 which may be secured to the portion 43 by rivets 46 or other suitable means.

Figure 5:
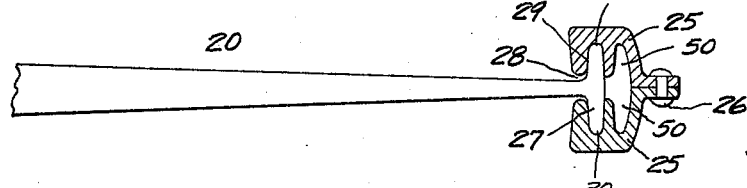
Fig. 5 is a sectional view taken on the line 5—5 of Fig. 3.

The construction shown in Fig. 5 may be modified as in Fig. 7 in which the cylindrical ends 27 instead of being formed to present a spherical surface at their ends, may be formed to present conical surfaces 47 in their place, the recesses 48 in the housing halves 49 being altered accordingly. The modification shown in Fig. 7 may be carried out to a further extent as illustrated in Fig. 8 in which the conical ends 47 of the cylindrical portion 27 are increased in length until they constitute the greater portion of the length of the end portions 27. The recesses 48 in the housing halves 49, of course, are altered accordingly.

In all of the above described constructions the housing halves may be provided with recesses such as 50 cooperating with each other to form an oil reservoir for the purpose of lubricating the wearing surfaces between the spring ends and their corresponding recesses in the housing halves. Lubricant may be introduced into the recesses 50 in any of the conventional manners employed for introducing lubricant into any lubricant passage.

Figure 9:
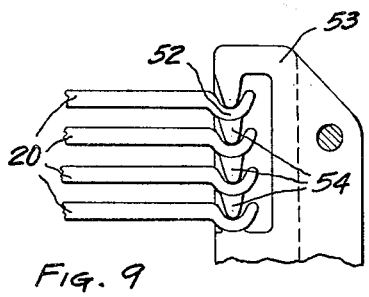
Fig. 9 is a view taken on the line 9—9 of Fig. 7, but showing a different modification of the connection for the end of the spring.
Figure 10:
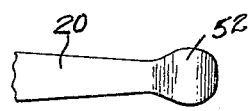
Fig. 10 is a plan view of the end of the spring leaves shown in Fig. 9.

In Figs. 9 and 10 a still different form of construction is shown. In this case the ends of the leaves 20 are each formed to present an upwardly opening trough 52, the axis of which is disposed perpendicularly to the length of the corresponding leaf 20. The housing halves 53 in this case are provided with transverse bar members 54 extending from their side walls to the line of split of the assembled housing, and each cooperating pair of which is received in the trough of the corresponding end 52, the lower edge of the bar members 54 being slightly knife-shaped so as to reduce the friction between the same and the end of the spring during movement of one relative to the other. The bar members 54 are preferably so spaced that there is very little, if any, clearance between any one of the trough-shaped spring ends and the bar below the same when the spring is in assembled condition.

Figure 11:
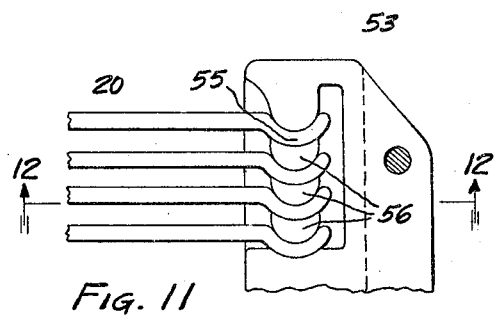
Fig. 11 is a view similar to Fig. 9 showing a modification thereof.
Figure 12:
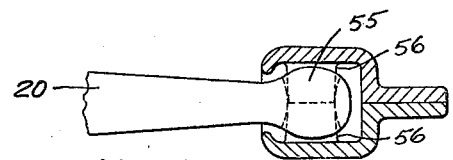
Fig. 12 is a view taken as on the line 12—12 of Fig. 11.

As illustrated in Fig. 10 I prefer to flatten the end of each leaf 20 during the formation of the same so as to increase the width of the same and decrease its thickness and then form such end into the trough 52 described. This enables me to obtain a greater bearing surface between the trough ends 52 and the corresponding bars 54. This construction may be modified as illustrated in Fig. 11 in order that the spring may take thrust loads through its ends. In this construction the trough shaped ends 55 are formed with circularly sectioned inner and outer surfaces, and the upper and lower surfaces of the bar members 56 are formed complementary to the adjacent surfaces of the ends 55 which have bearing there-against. This construction maintains the troughs against movement lengthwise of the springs 20 relative to the housing portions 53. In connection with the construction shown in Fig. 11 I prefer that the inside of the troughs increase in width from the center of the leaves 20 to the edges thereof, as illustrated in Fig. 12 so that the ends of the trough have clearance between the same and the bar members 56, thereby permitting a limited amount of rocking movement between the housing portions 53 and the leaves 20 in a horizontal plane, and thereby relieve the springs of any stresses due to forces attempting to bend the springs against their width.

Figure 13:
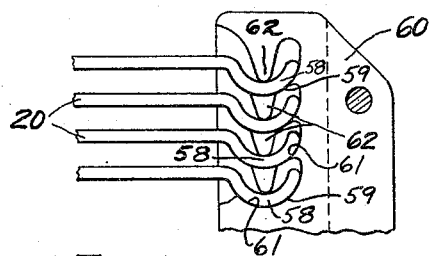
Fig. 13 is a view similar to Fig. 11 but showing a modification thereof.

The knife edge supporting construction shown in Fig. 9 may be modified as shown in Fig. 13 to take end thrust. In this case the ends 58 of the leaves 20 are formed with a cylindrical outer surface 59 and the housing 60 is provided with a surface 61 complementary thereto and extending in substantially full contact therewith. The knife edge bar members 62 contact against the bottom of the ends 58 and maintain them against the surfaces 61.

Figure 14:
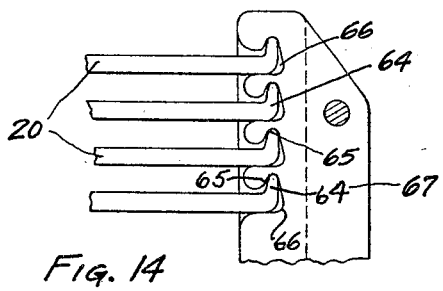
Fig. 14 is a view similar to Fig. 9 but showing a modified form of construction.

In the construction shown in Fig. 14 a result similar to that shown in Figs. 9 to 13 is obtained in a slightly different manner. In this case the ends of the leaves 20 are bent upwardly as at 64, their upper edges being suitably rounded off and being received in depressions 65 in the top of the pocket 66 which are formed in the housing members 67 for reception of the same. The pockets 66 are preferably of such a depth that the lower surfaces of the ends 64 contact against the lower wall of the corresponding pockets 66 so as to limit the vertical movement of the ends relative to the member 67. As will be evident from an inspection of the figure, end thrust may be taken care of by this construction.

Figure 15:
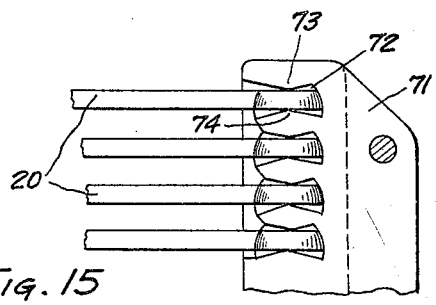
Fig. 15 is a view similar to Fig. 9 of another modified form of construction.
Figure 16:
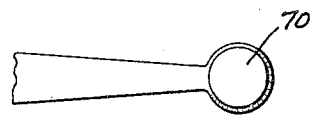
Fig. 16 is a plan view of the end of one of the spring leaves shown in Fig. 15.

In Figs. 15 and 16 the ends of the spring leaves 20 are formed circularly as at 70 and the edges of the portions 70 are formed as parts of a spherical surface. The housing members 71 are formed with recesses or pockets 72 for receiving the end 70, the upper and lower walls of each recess 72 being formed to present downwardly and upwardly facing knife edges 73 and 74 respectively. The side walls of the recesses 72 are formed to present spherical surfaces complementary to the outer edge surfaces of the ends 70. This construction thus supports ends of the spring leaves with a minimum of friction and maintains them in the housing 71 in a manner to permit thrust to be transmitted between the housing and the leaves.

Other variations of the above constructions are of course possible, and formal changes may be made in the specific embodiment of the invention described without departing from the spirit or substance of the broad invention, the scope of which is commensurate with the appended claims.

What I claim is:

1. In combination, a leaf spring comprising a plurality of superimposed spring leaves of substantially equal length, each of said leaves being provided at its ends with an elongated laterally projecting end portion extending perpendicularly with respect to the length of said leaf.

2. In combination, a leaf spring comprising a plurality of spaced superimposed spring leaves, each leaf of which terminates at one end in an enlarged laterally elongated projecting end portion lying perpendicularly with respect to the length of said leaf and integrally joined thereto.

3. In combination, a leaf spring comprising a plurality of superimposed spring leaves of substantially equal length, each of said leaves being provided at its ends with an elongated laterally projecting end portion extending perpendicularly with respect to the length of said leaf, and a housing member at each end of said spring in which the corresponding of said end portions are pivotally received.

4. In combination, a leaf spring comprising a plurality of spaced superimposed spring leaves, each leaf of which terminates at one end in an enlarged laterally elongated projecting end portion lying perpendicularly with respect to the length of said leaf and integrally joined thereto, and a housing provided with recesses in which said enlarged end portions are pivotally received, said housing being provided with surfaces abutting against the end surfaces of said enlarged ends to limit axial movement thereof relative to said housing.

5. In combination, a leaf spring comprising a plurality of leaves each having laterally projecting enlarged cone-like ends the axes of which are disposed perpendicularly with respect to the axis of the corresponding leaf, and confining means for the ends of said leaves comprising a housing formed in two parts and secured together in abutting relationship, each of said parts being provided with a plurality of spaced cone-like recesses therein opening on the abutting surface thereof and each of which cooperates with an opening in the other of said parts to embrace one of said enlarged ends.

6. In combination, a spring leaf having laterally projecting enlarged end portions formed to present oppositely disposed conical surfaces having aligned axes disposed perpendicularly with respect to the length of said spring, and confining means for the ends of said spring comprising a housing formed in two parts and secured together in abutting relationship, each of said parts being provided with cone-like recesses complementary to said cone-like surfaces, and said end portions being rotatably confined in said recesses.

7. In combination, a leaf spring provided with an enlarged cylindrically shaped terminal portion, the axis of which is disposed perpendicularly with respect to the length thereof, said cylindrically shaped terminal portion being provided with cone-like end portions, and confining means for the end of said spring comprising a housing formed in two parts and secured together in abutting relationship, each of said parts being provided with a cone-like recess complementary in shape to and rotatably confining said cone-like end portions therein.

CLARENCE A. BROCK.